United States Patent [19]

Peter et al.

[11] 3,716,995
[45] Feb. 20, 1973

[54] HYDRODYNAMIC TRANSMISSION

[75] Inventors: Wolfgang Peter; Hans Hanke, both of Stuttgart, Germany

[73] Assignee: Daimler-Benz Aktiengesellschaft, Stuttgart-Unterturkheim, Germany

[22] Filed: Sept. 16, 1971

[21] Appl. No.: 181,006

[52] U.S. Cl. ..................................60/54, 60/DIG. 5
[51] Int. Cl. ...............................................F16d 33/00
[58] Field of Search ..............................60/54, DIG. 5

[56] References Cited

UNITED STATES PATENTS

| | | | |
|---|---|---|---|
| 2,141,305 | 12/1938 | Kosters | 60/54 |
| 2,280,042 | 4/1942 | Duffield | 60/54 |
| 2,459,734 | 1/1949 | McCracken | 60/54 |

*Primary Examiner*—Edgar W. Geoghegan
*Attorney*—Craig, Antonelli and Hill

[57] ABSTRACT

A hydrodynamic transmission whose degree of filling and therewith whose transmission capability is adapted to be controlled by an external circulation equipped with a control valve; a gap is thereby provided at the outer diameter of the working space between the inside of the pump shell and the outside of the turbine shell through which working medium is continuously discharged into a stationary spiral housing that is connected with the external circulation terminating at its other end directly in the inlet of the pump; the external circulation is connected with the control valve by way of a single line while the circulation containing the filling pump is also connected with this control valve.

25 Claims, 1 Drawing Figure

PATENTED FEB 20 1973
3,716,995
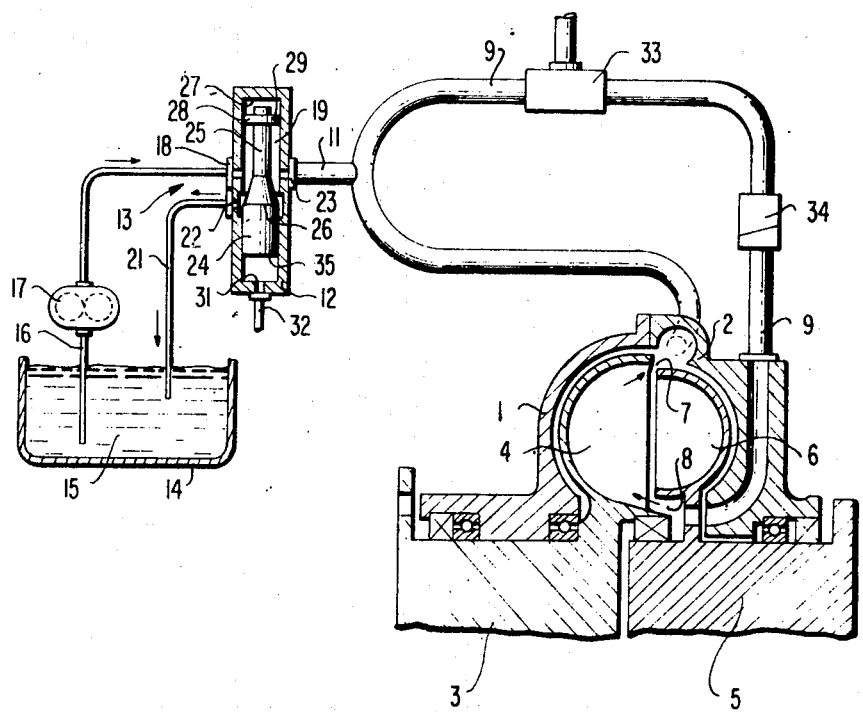
INVENTOR
WOLFGANG PETER
HANS HANKE
BY Craig, Antonelli & Hill
ATTORNEY

HYDRODYNAMIC TRANSMISSION

The present invention relates to a hydrodynamic transmission, whose degree of filling and therewith whose specific torque transmission capability is controllable by an external circulatory system having a control valve.

In hydraulic control-transmissions of this type, any desired rotational speed conditions between the input and output shaft can be adjusted at a predetermined existing load by the special constructions of the transmission with the use of a control valve.

The transmissions of this type known heretofore are very complicated in construction, require many connecting lines and additionally two relatively expensive control valves, which are connected with each other. It is the aim of the present invention to avoid these disadvantages and to propose a transmission which is neat in design and can be easily manufactured due to its simplicity, and which additionally can be controlled automatically with different types of control means. Furthermore, a high oil circulation flow is to be easily maintained by special means.

The underlying problems are solved according to the present invention in that mutually corresponding pump and turbine blade parts are disposed opposite one another in the axial direction and in that a gap is provided at the outer diameter of the working space between the inside of the pump shell as well as the outside of the turbine shell, which gap conducts a portion of the working medium continuously discharged thereby out of the transmission into a stationary spiral housing, to which is connected a closed circulatory system connected directly with the inlet channel of the pump, whereby the circulatory system is in communication by way of a single control line with a control valve to which is also connected the filling pump circulation. The housing of the transmission is therefore fixedly arranged so as to be stationary and carries at the outer diameter a spiral housing-like channel. As a result thereof, the transmission is so constructed that it has the tendency to discharge a portion of the working medium present in the working space into the spiral housing by way of the gap which is provided between the pump shell and the turbine shell. According to a further feature of the present invention, the pump shell is thereby so constructed that it overlaps the turbine shell both in proximity to the axis as well as at its periphery. It is additionally assured by such a construction of the pump and turbine shells that a fluid stream can flow back into the working space without high pressure loss.

A rotational speed control is obtained according to the present invention in that the supply of the working medium into the transmission or the discharge of the working medium out of the transmission is controlled by way of the control valve by a change of the pressure of the control line in relation to the pressure within the working space.

The control valve itself is so constructed that the control line connection, the filling pump connection as well as the oil sump connection terminate in a common chamber of the control valve and the control line connection is in constant communication with the filling pump connection whereas the oil sump connection is more or less closed or is completely closed for the control of the inflow into or outflow out of the valve by the selective or automatic movement of the control piston. Furthermore, the control valve may be so constructed that the control valve connection and the filling pump connection are arranged at the control valve housing mutually opposite and the diameter of the control piston which within the area of these connections has a lesser diameter than the inner diameter of the control valve cylinder housing, increases toward the oil sump connection, preferably conically, up to a control edge which is disposed within the area of the oil sump connection and sealingly abuts at the inner surface of the housing of the control valve. The control valve is so constructed for the automatic control of the control valve, especially at a super-elevated pressure in the circulation of the working medium that the control piston includes a flange-like piston step sealingly abutting at the cylinder inner wall on its side opposite the control edge within the area between the control line and filling pump connections and one cylinder end wall whereby a throttle bore extends in the axial direction through the piston step or spool. This throttle bore permits a portion of the working medium to reach slowly the other side of the flange-like piston step during a pressure increase and assures in this manner a pressure equalization and therewith an automatic control of the transmission.

The control valve, as to the rest, may be so constructed that the cylindrical control valve housing includes within the area of the other cylinder end wall, a connection for control air pressure. The piston of the control valve can be selectively displaced by means of this control air pressure. However, this displacement and therewith the control of the transmission may also be realized mechanically, electrically or hydraulically.

A cooling installation of conventional construction may be arranged in the external circulatory system of the transmission so that the transmission automatically maintains a cooling circulation.

A complete emptying of the transmission circulation upon a corresponding adjustment of the control valve is prevented in that a shut-off or closure valve is arranged in the external circulation of the transmission which automatically interrupts the external circulation in case of a decrease of the pressure in the transmission to a predetermined value. It is prevented by means of this shut-off or closure valve that the cooling circulation together with the cooler is completely emptied during the disengagement. The response velocity during engagement of the transmission is thereby improved at the same time.

Accordingly, it is an object of the present invention to provide a hydrodynamic transmission which avoids the aforementioned shortcomings and drawbacks encountered with the prior art constructions.

It is another object of the present invention to provide a hydrodynamic transmission which is relatively simple in construction and minimizes the need of numerous connecting lines and expensive control valves.

A further object of the present invention resides in a hydrodynamic transmission which is not only simple in construction but can be controlled by any one of numerous types of control media.

Still another object of the present invention resides in a hydrodynamic transmission which permits the maintenance of a high oil circulation without any great difficulties.

Still another object of the present invention resides in a hydrodynamic transmission which minimizes the pressure losses on the part of fluid flows flowing back into the working space.

A further object of the present invention resides in a hydrodynamic transmission of the type described above which is characterized by an extraordinarily simple control.

These and further objects, features and advantages of the present invention will become more apparent from the following description when taken in connection with the accompanying drawing which shows, for purposes of illustration only, one embodiment in accordance with the present invention and wherein The single FIGURE is a somewhat schematic view of a hydrodynamic transmission and control system in accordance with the present invention.

Referring now to the single FIGURE of the drawing, the transmission according to the present invention which makes possible an application of the principle of filling control with the aid of a control valve, includes a stationary housing 1 having a spiral channel or duct 2. The rotatable parts, namely the drive shaft 3 with the pump shell 4 and the output shaft 5 with the turbine shell 6 are rotatably supported in the stationary housing 1 by conventional bearing means. The mutually corresponding pump and turbine blade parts face one another in the axial direction and thus form the working space whereby the pump shell 4 overlaps the turbine shell 6 both in proximity to the axis as well as at the periphery so that a gap 7 results between the inner diameter of the pump shell 4 and the outer diameter of the turbine shell 6. A strong discharge tendency into the spiral channel 2 under all operating conditions results from such a construction of the pump and turbine so that the gap 7 therefore conducts continuously a portion of the working medium out of the transmission into the stationary spiral channel 2.

A closed external circulatory system 9 connected directly with the inlet channel 8 of the pump is connected with the spiral channel 2. The external circulatory system 9 is connected by way of only a single control line 11 with a control valve 12, to which is connected a filling pump circulatory system generally designated by reference numeral 13.

The filling pump circulation system 13 includes a tank 14 which is filled with the working medium 15. A suction line 16 extends into the working medium 15 into which is connected a pump unit 17 and which terminates by way of the filling pump connection 18 in the chamber 19 of the control valve 12. The filling pump circulation system 13 is completed by a line 21 which is connected, on the one hand, with the oil sump connection 22 of the control valve 12 and, on the other, extends into the tank 14. The control valve 12 is now so constructed that the control line connection 23, the filling pump connection 18 as well as the oil sump connection 22 terminate in the common chamber 19 and the control line connection 23 has a communication at all times with the filling pump connection 18 whereas the oil sump connection 22 is more or less closed or even closed completely for the control of the supply to and discharge out of the control valve by selective or automatic movement of the control piston 24. As to the rest, the control valve 12 is so constructed that the control line connection 23 and the filling pump connection 18 are arranged at the control valve housing mutually opposite. The diameter 25 of the control piston 24 has thereby a lesser diameter within the area of these connections 18 and 23 than the inner diameter of the control valve cylinder housing. The control piston is conically enlarged in the direction toward the oil sump connection 22 up to a control edge 26. This control edge 26 is disposed within the area of the oil sump connection 22 and as to the rest, abuts sealingly against the inner surface of the control cylinder housing 12. It is possible by means of such an installation that the supply of the working medium into the transmission or the discharge of the working medium out of the transmission can be controlled by way of the control valve 12 by a change of the pressure in the control line 32.

For the automatic control of the transmission in case of a pressure increase the control piston 24 includes a flange-like piston step or spool 28 sealingly abutting against the inner wall of the control valve 12 on its side opposite the control edge 26 within the area between the orifice of the filling pump connection 18 and one abutting cylinder end wall 27; an axial throttle bore 29 extends through the piston step 28 in the axial direction.

The control valve 12 is advantageously constructed as a servo valve and for that purpose is provided with a connection within the area of the other cylinder end wall 31 for a pneumatic actuation by control air pressure.

Finally, a cooler 33 and a shut-off or turn-off valve 34 of conventional construction are arranged in the external circulation 9. The flow through the cooler 33 is maintained by the transmission itself. The shut-off valve 34 serves for the increase of the response velocity and for the decrease of the residual torque in the emptied condition of the hydrodynamic coupling.

A rotational speed control is realized in the transmission according to the present invention in the following manner:

The external circulation system 9 is connected with the control valve 12 by way of a single control line 11. If the drive shaft 3 is set into rotation, then the control pressure from the control line 11 acts counter to the excess pressure built up by the transmission when the filling pump aggregate 17 is engaged. Depending on the adjustment of the control valve 12, a predetermined quantity of the working medium is supplied to the external circulation system 9 or flows off out of the same into the tank 14 by way of the lines 11 and 21. In case a force is applied to the lower end face 35 of the control piston 24 adjacent the cylinder bottom 31, the piston 24 is pressed against its upper abutment and interrupts with its control edge 26 the connection of the connections 18 and 23 with connection 22. In this position the entire supply flow of the oil pump 17 serves for the filling of the transmission.

If as a result thereof the pressure rises in the transmission as well as in the external circulation system 9, then it acts by way of the throttle bore 29 on the surface of the flange-like piston step 28 adjacent the cylinder top 27. As a result thereof, the piston 24 is displaced toward the cylinder bottom 31 against the air pressure existing in the line 32. As a result thereof the connections 18 and 23 are again connected with connection 22 and the excess quantity of the working medium flows off into the tank 14 by way of the control line 11, the chamber 19, the connection 22 and the line 21.

A decrease or increase of the control pressure admitted to the control valve 12 by way of the connection 32 has as a result a decrease or an increase of the transmission filling and therewith a decrease or an increase of the transmitted torque. However, since a decrease of the transmission capacity with an existing load moment is synonymous with a decrease of the rotational speed condition, the output rotational speed of the transmission can thus be changed by a change of the control air pressure.

In order to improve the response-velocity when engaging the transmission, it is appropriately prevented that the external circulation system 9 with the cooler 33 is completely emptied during the disengagement. A turn-off valve 34 of any conventional construction serves for the purpose which is installed in the external circulation system 9. It is so constructed that it is closed by a spring force in case of a decrease of the superimposed pressure in the transmission and a complete emptying of the external circulation system 9 is prevented. The residual torque input with an emptied transmission is strongly reduced in an advantageous and surprising manner by the installation of this valve. It is understandable that the shifting periods should be very short whereby the working pressure should have no influence, if possible, on the shifting periods. Since valves as may be used for the shut-off valve 34 are known as such, a detailed description thereof is dispensed with herein.

While we have shown and described only one embodiment in accordance with the present invention, it is understood that the same is not limited thereto but is susceptible of numerous changes and modifications as known to those skilled in the art and we, therefore, do not wish to be limited to the details shown and described herein but intend to cover all such changes and modifications as are encompassed by the scope of the appended claims.

What we claim is:

1. A hydrodynamic transmission whose degree of filling and therewith whose transmission capacity is adapted to be controlled by an external circulatory system having a control valve means, characterized in that corresponding pump and turbine blade parts of pump and turbine means mutually face one another in the axial direction to form a working space, and in that a gap is provided substantially at the outer diameter of the working space between the inside of the pump shell and the outside of the turbine shell, said gap conducting a portion of the working medium continuously discharged thereby out of the transmission into a stationary housing means, the external circulatory system being connected with said housing means and being operatively connected with the control valve means by way of only a single control line, and a filling pump circulation means being operatively connected also with said control valve means.

2. A transmission according to claim 1, characterized in that the external circulatory system is connected directly with the inlet channel of the pump means.

3. A transmission according to claim 1, characterized in that said gap is in communication with a spiral channel in said housing means.

4. A transmission according to claim 1, characterized in that the pump shell overlaps the turbine shell both in proximity to the axis as well as at the periphery.

5. A transmission according to claim 1, characterized in that the supply of working medium into the transmission or discharge of the working medium out of the transmission is controlled by way of the control valve means by changing the pressure in a control line in relation to the pressure in the working space.

6. A transmission according to claim 5, characterized in that the control valve means is provided with a control line connection, with a filling pump connection and with an oil sump connection terminating in a common chamber, and in that the control line connection has a constant communication with the filling pump connection whereas the oil sump connection is adapted to be more or less closed by movement of a control piston means in the control valve means for the control of the supply to and discharge out of the valve means.

7. A transmission according to claim 6, characterized in that the movement of the control piston means is selective.

8. A transmission according to claim 6, characterized in that the movement of the control piston means is automatic.

9. A transmission according to claim 6, characterized in that the oil sump connection is adapted to be completely closed by said control piston means.

10. A transmission according to claim 6, characterized in that the valve means includes a control valve housing means, the control line connection and the filling pump connection being arranged substantially mutually opposite one another on the control valve housing means and the diameter of the control piston means, which within the area of said two last mentioned connections, has a lesser diameter than the inner diameter of the chamber of the control valve housing means, increases in the direction toward the oil sump connection up to a control edge which is disposed within the area of the oil sump connection and sealingly abuts the inner surface of the chamber of the control valve housing means.

11. A transmission according to claim 10, characterized in that the diameter of the piston increases conically in the direction toward the oil sump connection.

12. A transmission according to claim 10, characterized in that the control piston means includes a flange-like piston step sealingly abutting at the inner wall of the valve housing means on the side opposite the control edge within the area between the control line and filling pump connections and one cylinder end wall, and in that a throttle bore extends in the axial direction through the flange-like piston step.

13. A transmission according to claim 12, characterized in that the control valve housing means is provided within the area of the other end wall with connecting means for a control medium.

14. An installation according to claim 13, characterized in that a cooling means is arranged in the external circulatory system.

15. An installation according to claim 14, characterized in that a cutoff valve means is arranged in the external circulatory system which automatically interrupts the external circulatory system when the pressure in the transmission decreases to a predetermined value.

16. A transmission according to claim 15, characterized in that said gap is in communication with a spiral channel in said housing means.

17. A transmission according to claim 16, characterized in that the external circulatory system is connected directly with the inlet channel of the pump means.

18. A transmission according to claim 17, characterized in that the pump shell overlaps the turbine shell both in proximity to the axis as well as at the periphery.

19. A transmission according to claim 1, characterized in that the control valve means is provided with a control line connection, with a filling pump connection and with an oil sump connection terminating in a common chamber, and in that the control line connection has a constant communication with the filling pump connection whereas the oil sump connection is adapted to be more or less closed by movement of a control piston means in the control valve means for the control of the supply to and discharge out of the valve means.

20. A transmission according to claim 19, characterized in that the valve means includes a control valve housing means, the control line connection and the filling pump connection being arranged substantially mutually opposite one another on the control valve housing means and the diameter of the control piston means, which within the area of said two last mentioned connections, has a lesser diameter than the inner diameter of the chamber of the control valve housing means, increases in the direction toward the oil sump connection up to a control edge which is disposed within the area of the oil sump connection and sealingly abuts the inner surface of the chamber of the control valve housing means.

21. A transmission according to claim 20, characterized in that the diameter of the piston increases conically in the direction toward the oil sump connection.

22. A transmission according to claim 20, characterized in that the control piston means includes a flange-like piston step sealingly abutting the inner wall of the valve housing means on the side opposite the control edge within the area between the control line and filling pump connections and one cylinder end wall, and in that a throttle bore extends in the axial direction through the flange-like piston step.

23. A transmission according to claim 22, characterized in that the control valve housing means is provided within the area of the other end wall with connecting means for a control medium.

24. An installation according to claim 1, characterized in that a cooling means is arranged in the external circulatory system.

25. An installation according to claim 24, characterized in that a cutoff valve means is arranged in the external circulatory system which automatically interrupts the external circulatory system when the pressure in the transmission decreases to a predetermined value.

* * * * *